(12) United States Patent
Grasselt et al.

(10) Patent No.: US 9,922,106 B2
(45) Date of Patent: *Mar. 20, 2018

(54) REALLOCATING JOBS FOR CHECKING DATA QUALITY

(71) Applicant: International Business Machines Corporation, Armonk, NY (US)

(72) Inventors: Mike Grasselt, Leinfelden-Echterdingen (DE); Albert Maier, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,105

(22) Filed: Oct. 12, 2016

(65) Prior Publication Data

US 2017/0032002 A1 Feb. 2, 2017

Related U.S. Application Data

(63) Continuation of application No. 13/962,342, filed on Aug. 8, 2013, now Pat. No. 9,514,212.

(30) Foreign Application Priority Data

Aug. 21, 2012 (GB) .................................. 1214853.2

(51) Int. Cl.
    *G06F 17/30* (2006.01)
    *G06F 9/50* (2006.01)
    (Continued)

(52) U.S. Cl.
    CPC ...... *G06F 17/30563* (2013.01); *G06F 9/4843* (2013.01); *G06F 9/50* (2013.01);
    (Continued)

(58) Field of Classification Search
    CPC ......... G06F 17/30592; G06F 17/30569; G06F 9/4843; G06F 11/3419; G06F 2201/81; G06F 17/30563
    (Continued)

(56) References Cited

U.S. PATENT DOCUMENTS 6,574,605 B1   6/2003  Sanders
7,310,646 B2  12/2007  Rangadass et al.
(Continued)

FOREIGN PATENT DOCUMENTS

CN   1983194 A   6/2007
CN   101017546 A  8/2007
CN   102473116 A  5/2012

OTHER PUBLICATIONS

United Kingdom IPO Seach Report for Application No. GB1214853.2, dated Dec. 11, 2012, 3 pages.
(Continued)

*Primary Examiner* — Shahid Alam
(74) *Attorney, Agent, or Firm* — Cantor Colburn LLP (57) ABSTRACT

The invention provides for checking data quality of data of an application program by a data quality management system. At least one of a plurality of jobs are executed for evaluating the data for compliance with one or more quality criteria. The runtime behavior of the at least one executed job is monitored to determine a current runtime behavior of the executed job. The monitored job is reclassified by reallocating the job to a job set representing the determined current runtime behavior.

20 Claims, 3 Drawing Sheets

(51) Int. Cl.
*G06F 9/48* (2006.01)
*G06F 11/34* (2006.01)
*G06F 11/30* (2006.01)

(52) U.S. Cl.
CPC ...... *G06F 11/3065* (2013.01); *G06F 11/3419* (2013.01); *G06F 17/3051* (2013.01); *G06F 17/30592* (2013.01); *G06F 2201/81* (2013.01)

(58) Field of Classification Search
USPC .......................................................... 707/602
See application file for complete search history.

(56) References Cited

U.S. PATENT DOCUMENTS

| | | | |
|---|---|---|---|
| 7,590,972 B2 * | 9/2009 | Axelrod | G06Q 99/00 707/783 |
| 7,797,708 B2 | 9/2010 | Weber | |
| 8,145,653 B2 | 3/2012 | Kosov et al. | |
| 8,219,848 B2 | 7/2012 | Branson | |
| 9,152,662 B2 | 10/2015 | Bhide et al. | |
| 9,244,809 B1 | 1/2016 | Viakkumadathill | |
| 9,390,112 B1 * | 7/2016 | Daly | G06F 17/30303 707/687 |
| 9,460,131 B2 | 10/2016 | George et al. | |
| 9,547,702 B2 * | 1/2017 | Vilakkumadathil | G06F 9/44589 717/126 |
| 9,600,776 B1 * | 3/2017 | Daly | G06N 99/005 706/12 |
| 2005/0216282 A1 | 9/2005 | Chen et al. | |
| 2006/0230048 A1 | 10/2006 | Kosov et al. | |
| 2006/0242172 A1 | 10/2006 | Tsyganskiy et al. | |
| 2007/0005535 A1 | 1/2007 | Salahshour et al. | |
| 2008/0115143 A1 | 5/2008 | Shimizu | |
| 2008/0120129 A1 | 5/2008 | Seubert | |
| 2008/0126409 A1 | 5/2008 | Weber | |
| 2009/0024572 A1 | 1/2009 | Mehta et al. | |
| 2009/0125531 A1 | 5/2009 | Scheerer et al. | |
| 2011/0055147 A1 | 3/2011 | Joerg et al. | |
| 2013/0055042 A1 | 2/2013 | Al Za'noun et al. | |
| 2013/0081025 A1 | 3/2013 | Nardelli et al. | |
| 2013/0185729 A1 | 7/2013 | Vasic et al. | |

OTHER PUBLICATIONS

Yang et al.,"Combining Proactive and Reactive Predictions for Data Streams" Research Track Poster, pp. 710-715. KDD '05, Aug. 21-24, 2005, Chicago, Illinois, USA. Copyright 2005 ACM 1-59593-135-X/05/0008.

* cited by examiner

REALLOCATING JOBS FOR CHECKING DATA QUALITY

DOMESTIC PRIORITY

This application is a continuation of U.S. patent application Ser. No. 13/962,342, filed Aug. 8, 2013, which claims priority to Great Britain Patent Application No. 1214853.2, filed Aug. 21, 2012, and all the benefits accruing therefrom under 35 U.S.C. § 119, the contents of which in its entirety are herein incorporated by reference.

FIELD OF THE INVENTION

The present invention relates to the field of data processing, and more particularly to the field of data quality checking.

BACKGROUND

Enterprise resource planning (ERP) systems and related data management systems are of great importance for companies of all kinds of industries and technological disciplines. A significant financial and time investment is spent on the prohibition and cure of erroneous data within ERP systems, as erroneous data may result in erroneous manufacturing processes, data loss, and may render crucially important data sets useless.

Some ERP systems already come with some integrated modules for ensuring data quality. Often, external systems are used alternatively or in addition to the integrated modules in order to guarantee and maintain data quality. A concern connected with using external systems for data quality check is that additional time is required for adapting the external system to the semantic structure of the business objects of the ERP system or even to the data structures used for storing the business objects in order to enable the external system to execute the quality checks. Thus, the execution, as well as the setup of data quality checks in the context of an ERP system may be time consuming.

A further concern is that data quality checks, and in particular, global data quality checks involving the processing of a plurality of business objects from one or more distributed data sources may be highly time consuming. Thus, an ongoing data quality check may constitute a bottleneck for the performance of an ERP system. A further concern is that the runtime behavior of the quality checks may vary greatly and unpredictably in dependence on the evaluated data and/or the response time of external resources comprising some parts of the ERP system's data to be evaluated.

SUMMARY

According to embodiments, a computer-implemented method, computer-readable medium, and computer system for checking data quality of data of an application program, e.g., an ERP system, by a data quality management system (DQMS), is provided.

A computer-implemented method for checking quality of data of an application program by a data quality management system (DQMS) includes executing, by the DQMS, at least one of a plurality of jobs. The at least one job is adapted for evaluating the data for compliance with one or more quality criteria. Each of the jobs is a member of one of a plurality of job sets. The plurality of job sets include at least a first job set and a second job set. Each of the job sets represents a runtime behavior category. The jobs contained in each job set have been classified into the runtime behavior categories in accordance with their respective runtime behavior. The execution of the jobs contained in the first job set is triggered by a message received by the data quality management system from the application program. The execution of the jobs contained in the second job set is triggered by a scheduler of the DQMS. The method further comprises monitoring the runtime behavior of the at least one executed job by the data quality management system for determining a current runtime behavior of the job, and reclassifying the at least one monitored job by reallocating the job to the job set representing the determined current runtime behavior.

In another embodiment, a computer-readable medium comprising computer-readable program code embodied therewith which, when executed by a processor, causes the processor to execute a method. The method includes executing at least one of a plurality of jobs. The at least one job is adapted for evaluating the data for compliance with one or more quality criteria. Each of the jobs is a member of one of a plurality of job sets. The plurality of job sets include at least a first job set and a second job set. Each of the job sets represents a runtime behavior category. The jobs contained in each job set have been classified into the runtime behavior categories in accordance with their respective runtime behavior. The execution of the jobs contained in the first job set is triggered by a message received by the data quality management system from the application program. The execution of the jobs contained in the second job set is triggered by a scheduler of the DQMS. The method further comprises monitoring the runtime behavior of the at least one executed job by the data quality management system for determining a current runtime behavior of the job, and reclassifying the at least one monitored job by reallocating the job to the job set representing the determined current runtime behavior In a further embodiment, a computer system comprising a DQMS is provided. The DQMS includes a processing engine, a monitoring module, a classification module and a scheduler. The DQMS is adapted for checking data quality of data of an application program. The processing engine is adapted for executing at least one of a plurality of jobs. The at least one executed job is adapted for evaluating the data for compliance with one or more quality criteria. Each of the jobs is a member of one of a plurality of job sets, and the plurality of job sets include at least a first job set and a second job set. Each of the job sets represents a runtime behavior category, and the jobs contained in each job set have been classified into the runtime behavior categories in accordance with their respective runtime behavior. Execution of the jobs contained in the first job set is triggered by a message received by the data quality management system from the application program. Execution of the jobs contained in the second and third job set is triggered by a scheduler of the data quality management system. The monitoring module is adapted for monitoring the runtime behavior of at least one of the executed jobs for determining a current runtime behavior of the job. The classification module is adapted for automatically or semi-automatically reclassifying the at least one monitored job by reallocating the job to the job set representing the determined current runtime behavior.

BRIEF DESCRIPTION OF THE DRAWINGS

The drawings referenced in the present application are only used to exemplify typical embodiments of the present invention and should not be considered to be limiting the scope of the present invention.

DETAILED DESCRIPTION

An 'application program' as used herein is any functionally coherent piece of program logic being operable to process, i.e., to create, modify and/or delete, one or more business objects. A 'business object' (BO) as used herein relates to a data object, e.g., an Idoc object, being specified in accordance with a 'business object scheme'. The term 'business object' as used herein will be used to refer to instances of a business object specified in the business object schema. A business object schema is a specification of the semantic structure of business objects and optionally of their interrelation with each other. For example, a business object schema may comprise a specification of the business object types 'analysis device' and 'biological sample', wherein according to the schema the 'analysis device' comprises attributes such as 'sample capacity', 'status', 'device type' or the like and the business object type 'biological sample' may comprise attributes such as 'sample type', 'age', 'patient-ID' or the like. Each BO instance is created in accordance with a respective BO definition specified in the BO schema.

A 'job' as used herein is a unit of work that is executed by a data processing system. In the embodiment, a job may be a compiled, executable binary code, e.g., bytecode, or may be interpretable program code. A 'runtime behavior' as used herein relates to features of the behavior of an executed job. A 'rule' as used herein is any piece of software code specifying a respective job and being modifiable by a programmer. For example, a rule can be a Java or C++ class or functional parts thereof, a PHP script or the like.

A 'data quality management system' (DQMS) as used herein is an application program, e.g., an ERP system, designed for managing data and comprising integrated or added capabilities to execute some quality checks on the managed data. Ensuring and maintaining 'data quality' as used herein relates to the task of ensuring and maintaining consistency of data, to the avoidance or removal of redundant data entries, to ensuring that data values are stored in a consistent data format (e.g., storing all dates in a consistent date format), to ensuring that the stored data is semantically or syntactically correct, or the like.

A 'transaction' as used herein is a unit of work performed by an application program against a database which is treated in a coherent way independent of other transactions. For example, a transaction may comprise submitting a command to a database operatively coupled to the application program for storing or modifying a BO or any of its attribute values in the database or for deleting the BO or attributes from the database. In an embodiment, a transaction follows an 'all or nothing' principle in accordance with the ACID concept (atomic, consistent, isolated and durable).

A 'pro-active check' as used herein is a data quality check which is executed before a transaction is committed to ensure that in case the data to be transferred in the transaction does not meet the quality criteria evaluated by the pro-active check, the transaction is not committed.

A 're-active' check as used herein is a data quality check which is executed after a transaction has been committed by the application program to ensure that in case the data having been transferred in the transaction does not meet the quality criteria evaluated by the re-active check, the data is identified. Depending on the re-active check and the determined quality deficiency, the erroneous or low-quality data may be automatically removed, corrected or reported.

An 'external resource' as used herein is any data resource being external to the data quality management system and comprising some data which needs to be evaluated in addition to the data of a BO of an application program for checking data quality of at least some of the BOs. The external resource may be a computer system or database connected to the data quality management system via a network, e.g., the Internet or an intranet.

A 'database' as used herein relates to any kind of data store, e.g., a set of file directories, XML files, to a relational or columnar database.

A 'extract-transfer-load' (ETL) job as used herein is any job being operable to extract BO instances or parts thereof of one or more BOs from the application program, to transfer the data into a data format that can be processed by the data quality management system, and to store the transformed data in a database operatively coupled to the data quality management system. An ETL job operating on a 'BO level' as used herein is an ETL job querying the data to be transferred via an application API corresponding to BOs and respective attributes as specified in the application program's BO schema, not via an interface of the database having physically stored the BOs. Thus, an ETL job operating on a 'BO level' operates based on the semantic, not the syntactic structure of a data object.

A 'legacy interface' as used herein is any pre-existing interface of a software application, e.g., an ERP system. A legacy interface may not have been designed for the purpose of data exchange with a DQMS but rather may have been designed e.g., for purposes not related to data quality checks, e.g., for the purposes of exchanging data with other applications or for executing database transactions by the application program.

An 'attribute', which is also referred to as "parameter" is a feature defining or describing a particular entity. Examples for a parameter are 'color', 'height', 'address' or the like.

Figure 1:
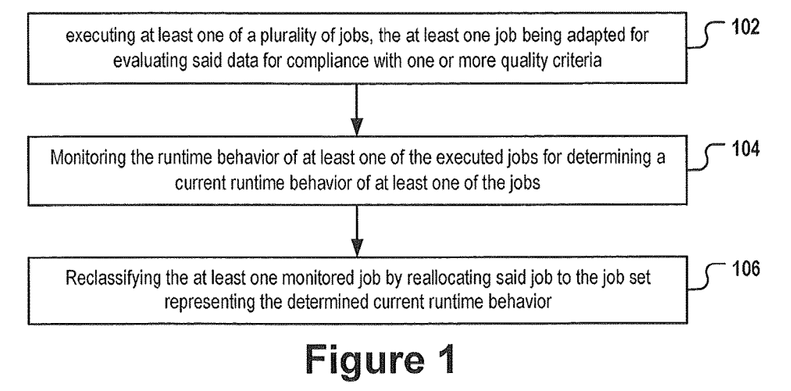
FIG. 1 shows a flowchart of a method comprising job reclassification in accordance with an embodiment.
Figure 2:
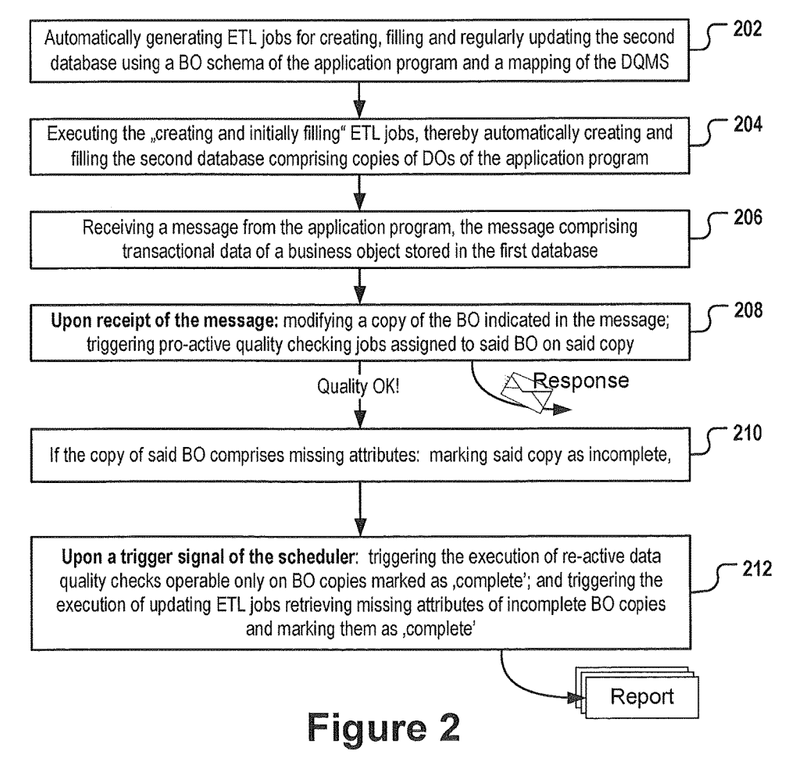
FIG. 2 shows a flowchart of method comprising ETL jobs creation in accordance with an embodiment.

FIG. 1 shows a flowchart of a method for evaluating data quality in a flexible and efficient manner by means of a data quality management system (DQMS) as depicted, for example, in FIG. 2. The DQMS ensures data integrity and quality of an application program, e.g., an ERP system that includes business objects such as "customer", "order", "department", or "employee". This may be performed by pro-active data quality checks preventing the adding of erroneous data from the beginning and/or by re-active data quality checks automatically determining, and optionally also curing, erroneous data after the data stores to the database of the ERP system. For example, the DQMS may automatically ensure that customer address data, e.g., e-mail addresses, birth dates and the like are entered in a data format that is consistent and valid.

In addition, data quality checks operating on multiple BOs could ensure that the semantic content of different BOs does not contradict each other. For example, a particular order should not be allowed to have assigned two different customers. If a particular department of a company has assigned more employees than the whole company, this is also a hint that the data basis of the ERP system is inconsistent. By integrating pro-active and re-active data quality checks respectively being triggered by different mechanisms, and by adapting the respective triggering mechanism to the monitored runtime behavior of the data quality checking jobs, the DQMS is operable to execute data quality checks on business object copies efficiently and without impeding the performance of the ERP system. By automatically generating ETL jobs, the total cost of ownership of the DQMS and also the time to value to build such a DQMS may be reduced.

In block 102 depicted in FIG. 1, a DQMS executes at least one of a plurality of jobs. At least some of the jobs are adapted for evaluating data of an application program for compliance with one or more quality criteria. The plurality of jobs may further comprise one or more ETL jobs for creating, initially filling and/or for updating a database of the DQMS comprising copies of BOs of the application program. In block 104, a monitoring module of the DQMS monitors the runtime behavior of the one or more executed jobs for determining the current runtime behavior of the jobs respectively. The information is used in block 106 by a classification module for reclassifying the one or more monitored jobs by re-allocating the jobs to a job set representing the job's determined runtime behavior.

FIG. 2 shows a flowchart of a method comprising the automated creation of ETL jobs. Some of the ETL jobs may be reclassified in dependence on their monitored runtime behavior and optionally also in dependence on some classification features assigned to the jobs by a user or automatically, and optionally also in dependence on a transactional mapping 323.

In block 202, a job factory module of the DQMS automatically generates one or more ETL jobs for creating, initially filling and/or updating a DQMS database, herein also referred to as 'second database', being operatively coupled to the DQMS and being used for storing copies of BOs of the application program. The creation comprises an evaluation of a BO schema of the application program and of a mapping. The mapping assigns BO types and their respective attributes to structural elements of the second database. The mapping may be modifiable by a user of the DQMS, e.g., via a graphical user interface. Thus, by manually adapting the mapping to comply with constraints imposed by the second database or other factors, it is possible, without any manual modification of existing ETL jobs and without a time consuming manual recreation of new ETL jobs, to easily adapt the DQMS and the ETL jobs to the constraints.

In block 204, the one or more ETL jobs for initially creating and filling the second database are executed. Thereby, the second database is automatically created and filled with automatically generated copies of the BOs of the application program. In block 206, the DQMS may receive a message from the application program. The message is sent upon the application program executing a database transaction on a BO to be created, modified or deleted. The message comprises an indication of the BO and may in addition comprise the modifications to be applied to the BO, e.g., one or more modified attribute values or the like.

The receiving of the message triggers in block 208 the execution of quality checking jobs being assigned to the BO indicated in the message and being contained in a first or the third job set, wherein the first job set comprises short-running, transaction-triggered jobs being executed only once upon a transaction. The third job set comprises short-running, message-triggered and short-running scheduler-triggered jobs being executed on attributes of a single BO only (i.e., data mandatorily received with a transaction-driven message from the application program executing a transactional modification of the BO. Data quality checking jobs being executed as a member of the first job sets and message-driven jobs of the third job set are executed as pro-active checks. This means, that the respective quality checks are triggered by the transaction (i.e., by the receipt of the message) and that the transaction is halted until the application program receives a response comprising an evaluation result of the data quality checking jobs contained in the first and/or third job set and being assigned to the BO.

The DQMS sends a response to the message to the application program, whereby the response indicates if the one or more executed quality checking jobs of the first and/or third job set determined that the transactional modification, creation or deletion of that BO copy (CBO) violated any quality requirements. As the second database comprises copies of the BOs of the application program, the result of the quality-checking jobs calculated for the BO-copies likewise applies to the respective BOs of the application program.

In case it is determined in block 208 that the transaction does not violate the quality requirements evaluated by the quality checking jobs in the first and/or third job set, the submitted responsible triggers the application program to commit the halted transaction. In block 210, the DQMS marks the BO copy as incomplete in case the message did not comprise all attribute values constituting the BO copy and in case the second database does also not comprise the missing attribute values. Missing attribute values can be determined by the DQMS by evaluating the BO schema in combination with the mapping and the second database having stored the respective attribute values in the structural elements specified in the mapping.

In block 212, a scheduler of the DQMS triggers the execution of jobs being contained in a second job set comprising long-running jobs, e.g., long-running re-active data quality checking jobs and/or BO-update-ETL jobs. The scheduler may in addition trigger the execution of jobs being contained in a third job set comprising short-running re-active data quality checking jobs. Each of the re-active data quality checking jobs and/or BO-update-ETL jobs may be assigned to one or more of the BOs as specified in the application BO schema. In case any of the BO copies is marked as incomplete, a BO-update-ETL job having been triggered by the scheduler and being assigned to the BO determines the missing attributes and automatically retrieves the attribute values via a business-object-level interface of the application program, completes the BO copy with the retrieved attribute values, and set a completeness parameter value of the copy to 'complete'.

The data quality checking jobs contained in the second job set are prohibited from evaluating any BO copy being marked as 'incomplete'. In case the respectively assigned BO copies are marked as 'complete', the re-active data quality checking jobs will evaluate the BO copy and optionally further data, e.g., the data contained in other BOs or being contained in external resources, in order to determine if the data quality of the BO violates some quality constraints. The result at least of the quality checks executed by the quality-checking jobs contained in the second job set may be stored in the form of a report which may be stored within the DQMS, displayed to a user and/or submitted to the application program.

Figure 3:
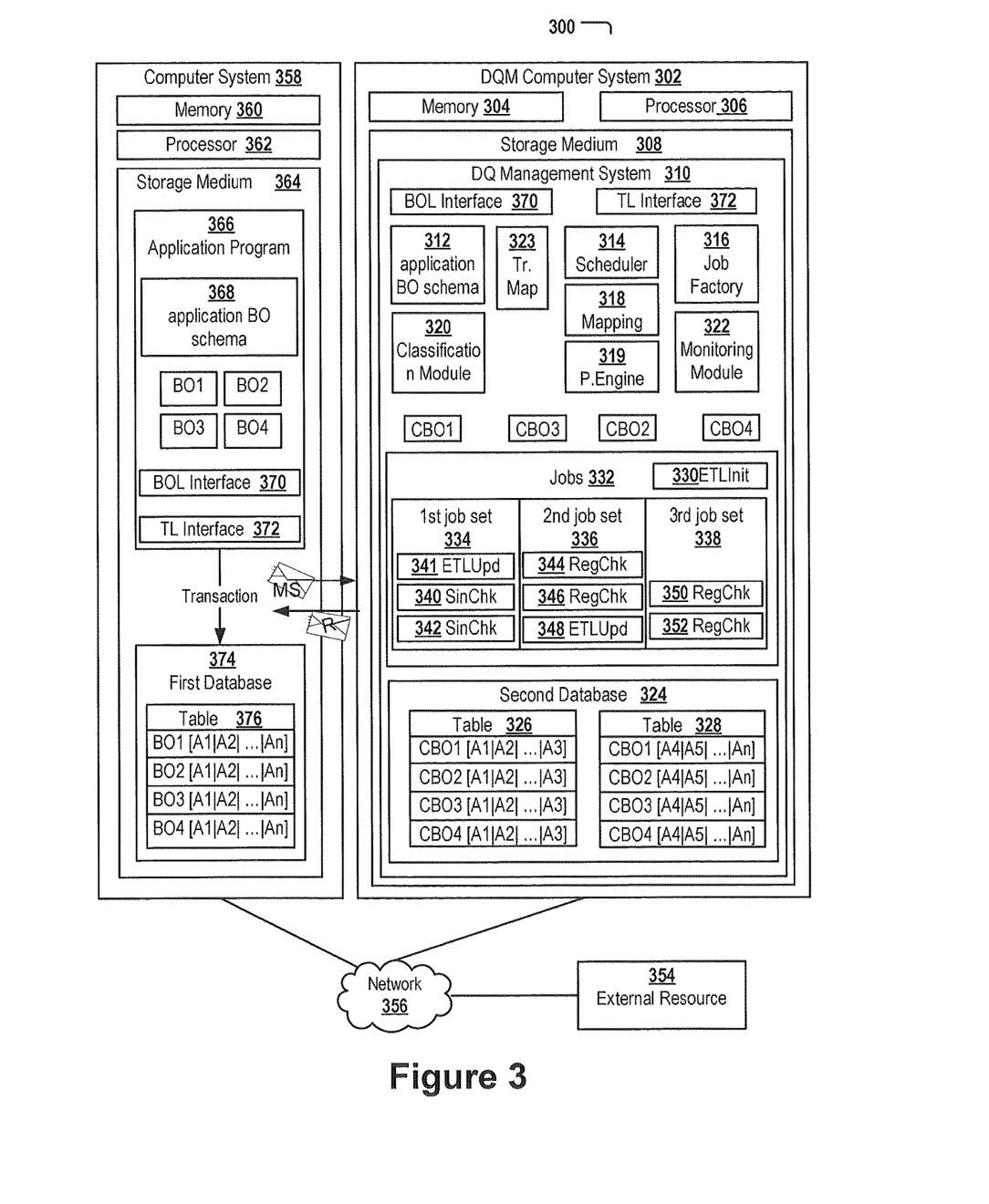
FIG. 3 shows an application program, e.g., an ERP system, and a DQMS in accordance with an embodiment.

FIG. 3 shows a block diagram of a distributed computer system 300 comprising a first computer system 358 and a second computer system 302. The first computer system comprises a memory 360, a processor 262, and a storage medium 364. The first computer system hosts an application program 366 comprising a plurality of BOs BO1-BO4 specified in accordance with an application BO schema 368. The application program comprises a transaction level interface 372 for executing transactions on a first database 374 being operatively coupled to the application program. The first application program may be hosted on the first computer or another computer system. The first computer system comprises one or more database tables 376 having stored the BOs BO1-BO4 and their respective attributes. In addition, application program 366 comprises a business-object-level interface 370, also referred herein as "application API", which is used by the ETL jobs of the DQMS 310 for retrieving data for initially filling and updating the BO copies CBO1-CBO4 contained in the second database. The source code of the application program may comprise some instructions within instruction blocks respectively specifying a transaction causing the transaction to halt and causing the sending of a message to the DQMS 310.

The transaction is committed to the first database only in case a response R to that message MS indicating that the data quality of the transaction is okay is received from the DQMS. The message may comprise an indication of the BO to be created, modified or deleted in the transaction, and optionally also the data to be used for the modification.

According to other implementation variants, an interception module interoperable with the application program and the first database may intercept any transaction to be executed by the application program on the first database and may halt the transaction until the response is received. The second computer system 302 comprises a memory 304, a processor 306 and a storage medium 308. The second computer system hosts a DQMS 310 operable to receive BO data from the application program 366 via a BO level interface 370 and being operable to receive, upon the application program executing a transaction, a message MS and to return a response R via a transaction-level interface 372. The DQMS 310 comprises a plurality of modules, e.g., a job factory module 316 for automatically creating one or more ETL jobs, a monitoring module 322 for monitoring the runtime behavior of a plurality of jobs 332 executed by a processing engine 319. The DQMS comprises a mapping 318, e.g., a file or database table comprising human-readable text, which assigns BOs (having the same semantic structure and BO schema definition as the BO copies) and their attributes to structural elements (e.g., tables 326, 328 and columns) of the second database 324.

A transactional mapping 323, e.g., a file or a database entry, assigns BO attributes to transactions supported by the transaction-level interface 372, thereby indicating if all attributes evaluated by a job triggered upon a transactional modification of a BO comprising the attributes will be received by the DQMS as part of the message MS. The transactional mapping may also be used in combination with the mapping 318 for instantiating a BO copy upon the receipt of a message comprising at least some attribute values of the BO.

Further, the DQMS comprises a copy 312 of the BO schema used by the application program 366 or is adapted to access the BO schema 312 of the application program stored in the first computer system. The BOs BO1-BO4 are stored in the first database 374. Respective copies CBO1-CBO4 of the BOs BO1-BO4 are stored in the second database after having executed one or more ETL jobs for creating and filling the second database 324. The tabular structure of the second database may, but not necessarily has to be identical to the first database. In case the structures of the first and second databases differ from each other, the ETL jobs have to adapt the data storing routines accordingly.

A combination of the application BO schema 312, the mapping 318 and the data contained in the second database 324 provides the job factory 316 with all required information for automatically creating the ETL jobs and provides the processing engine 319 with enough information to determine if a given BO copy is complete. The jobs 332 are grouped into a plurality of different job sets respectively characterized at least by a particular runtime behavior. The first job set 334 and the third job set 338 respectively short-running jobs, e.g., data quality checking jobs and/or BO-update-ETL jobs. The execution of jobs contained in the first and third job sets are triggered by a transaction (i.e., by receiving the message). Jobs in the first job set are executed only in response to the transaction. The jobs in the second and third job sets are executed on a regular basis and are triggered by the scheduler 314.

The second job set 336 comprises long-running jobs, e.g., data quality checking jobs and/or BO-update-ETL jobs. A fourth job set (not shown) may comprise jobs, e.g., job 330, to be executed only once for creating and/or initially filling the second database. The runtime behavior of any one of the jobs 332 is monitored by the monitoring module 322. The classification module 320 is adapted for reclassifying the jobs in dependence on at least the monitored runtime behavior. The data quality checking jobs contained in the first job set and, on the occasion of being message driven, also the jobs in the third job set are executed in a pro-active manner. This means, that the transaction is halted until the execution of the checks has terminated and until a response is received indicating that the data quality is OK. If the response indicates that the data quality does not meet the quality criteria evaluated, the transaction is aborted or only executed after manual review of the transaction by a user, thereby prohibiting entry of erroneous or low-quality data into the first database.

As the data quality checking jobs contained in the first and third job sets can be executed quickly, halting the transaction until a response is received guarantees that low-quality data is not stored without reducing the performance of the application program. The jobs contained in the second job set and, on the occasion of being scheduler-driven, also the jobs in the third job set are executed as re-active data quality checks. This means that the jobs are executed after a transaction was performed by the application program on respectively modified BO copies contained in the second database. Thus, the re-actively executed jobs cannot prohibit the storing of erroneous data, but can detect the errors and report them afterwards.

As the jobs contained in the second job set have determined to be very time-consuming, e.g., because they evaluate the data of a BO in combination with one or more further BOs and/or in combination with data being contained in an external resource 354. The external resource 354 may be connected to the second computer system via a network 356. As the data to be evaluated has to be transferred via a network, data quality checks involving data from external resources may be particularly slow, and halting a transaction until such kind of "cross-BO" or "cross-data resources" checks have finished could significantly slow down the application program. As the data quality checks are executed on a scheduled basis as re-active quality checks on copies of the BOs (and not on the original BOs of the first database), the performance of the application program is not negatively affected by executing the jobs in the second job set.

Figure 4:
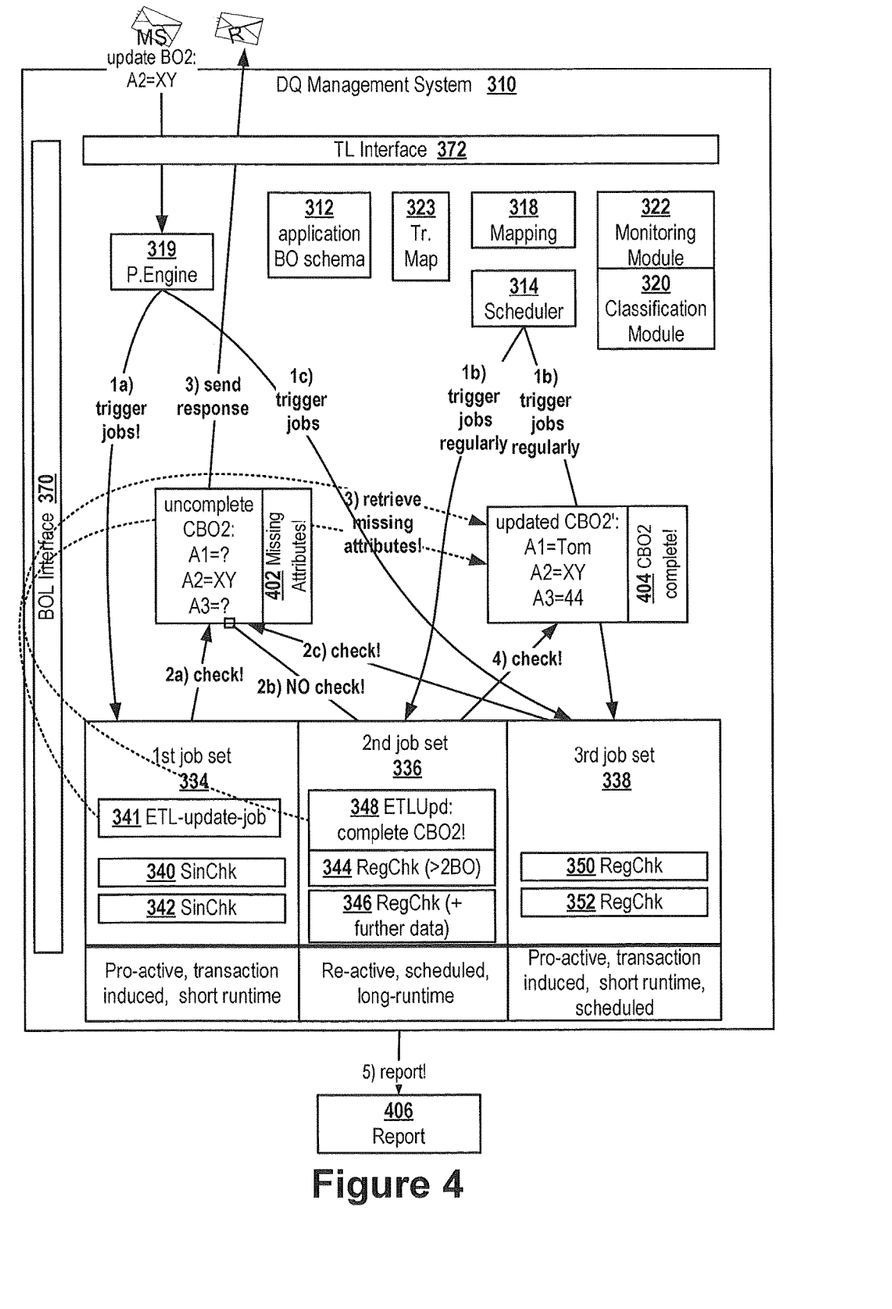
FIG. 4 shows some components of the DQMS in greater detail in accordance with an embodiment.

FIG. 4 shows some components of the DQMS 310 depicted in FIG. 3 in greater detail. Some arrows 1a)-5) are used for illustrating dynamic aspects of the components of the DQMS. The DQMS may receive a message MS via a transaction-level-interface 372 from an application program. The message may indicate that BO BO2 shall be modified by setting a second attribute A2 of the BO to a particular attribute value 'XY'. The processing engine 319 identifies, based on the mapping 318 and on the application schema 312, a corresponding copy CBO2 of the BO BO2. The processing engine may modify the CBO2 by setting its attribute A2 to "XY". In addition, the processing engine may determine that not all attributes of that CBO2 have already been received and stored in the second database. Therefore, the processing engine may mark CBO2 as incomplete by setting a completeness property to the value 'incomplete' 402.

The processing engine 319 may trigger, as indicated by the arrow 1a), short running jobs contained in the first job set. The jobs may be short running data quality checks 340, 342 evaluating the data quality of the data contained in the message and/or contained in the already available attributes of the data object copy CBO2. In parallel to 1a), the processing engine 319, upon receiving the message, may trigger the execution of jobs being contained in the third job set 338 comprising short-running jobs as indicated by the arrow 1c).

In response to 1a) and 1c), jobs 340, 342, 350 and/or 352 may be executed, as indicated by arrows 2a) and 2c) on the data contained in the received message and on the data already contained in the CBO2. Independent of whether the message MS was received, the scheduler 314 triggers the execution of all jobs in the first and third job set on a regular basis. For example, in case A2 represents the attribute 'email-address' and XY is a particular email address of a customer, job 340 may check if the attribute value XY comprises an '@' symbol and a valid top level domain separated by a '.' from a domain section in accordance with the pattern 'prefix @domain.topleveldomain'.

Jobs 350 or 352 may be responsible for determining if the e-mail address is contained in a black-list of e-mail addresses. As the black-list may be continuously updated, a regular execution of the job for determining if any e-mail address assigned to attribute A2 is contained in the blacklist may guarantee that no e-mail address contained in the blacklist is stored or maintained in the second database and, accordingly, also not in the first database of the application program. The execution of the jobs being contained in the second job set 336 is not triggered by the receipt of the message, but rather triggered by the scheduler 314.

In case the scheduler should initiate execution of the jobs in the second job set, the second jobs will not execute their respective data quality checks on CBO2 as it has been marked as incomplete (see 2b): NO check!). However, the scheduler may initiate the execution of an ETL update job 348 which may be executed for retrieving the missing attribute values via the BO level interface 370 from the application program and for completing the CBO2.

Depending on the respective implementation and runtime behavior of the individual ETL update jobs, an ETL update job for retrieving missing attribute values may be contained in any of the first, the second or the third job set. Thus, the retrieval of the missing attribute values and/or the retrieval of BOs having newly been added to the first database may be executed by ETL jobs 341 contained in the first job set or by ETL job 348 contained in the second job set. The ETL update jobs 341 or 348 retrieve all missing data of the CBO2 via a BO level interface 370 as indicated by arrow 3). After having retrieved the missing data, the CBO2 is updated with the additional data, thereby generating the complete CBO2'.

The completeness parameter of the CBO2' is set to the value 'complete' 404. The next time the execution of a data quality job contained in the second job set and being assigned to BO2 (and thus, accordingly, to CBO2') is triggered by the scheduler, the job 344, 346 is executed, as indicated by arrow 4) also on CBO2' as the completeness parameter of CBO2' indicates completeness.

Finally, a report is generated, as indicated by arrow 5). The report comprises at least the results of the data quality checking jobs contained in the second job set, but optionally also the results of the data quality checking jobs contained in the first and/or third job sets. The report may be output to a user, e.g., via a graphical user interface, returned to the application program, and/or stored to the storage medium 308.

As described above, computer-implemented method for checking quality of data of an application program by a data quality management system (DQMS) includes executing, by the DQMS, at least one of a plurality of jobs. The at least one job is adapted for evaluating the data for compliance with one or more quality criteria. Each of the jobs is a member of one of a plurality of job sets, the plurality of job sets comprising at least a first job set and a second job set.

Each of the job sets represents a runtime behavior category. The jobs contained in each job set have been classified into the runtime behavior categories in accordance with their respective runtime behavior. The execution of the jobs contained in the first job set is triggered by a message received by the data quality management system from the application program. The execution of the jobs contained in the second job set is triggered by a scheduler of the DQMS.

The method further includes monitoring the runtime behavior of the at least one executed job by the data quality management system for determining a current runtime behavior of the job; and reclassifying the at least one monitored job by reallocating the job to the job set representing the determined current runtime behavior. In an embodiment, the reclassification is executed automatically. According to some embodiments, the reclassification may be executed semi-automatically and may include prompting a user for approving to an automatically suggested reclassification. The features may be advantageous, because in dependence on the runtime behavior of a data quality checking job, the triggering mechanism initiating execution of the job may be modified.

Jobs having been determined to be executed in a comparatively short time period may be executed in response to a message, i.e., event driven, jobs having a different runtime behavior, e.g., a longer execution time, may be executed in a scheduled way. This may be particularly advantageous in the context of a DQMS as scheduling some kind of data quality checks, e.g., those having a long execution time, those requiring external data resources, those evaluating a log of data etc. may be triggered by a scheduler at times when the processing load is low, when only low network traffic to the external resources exist and/or when only few events cause the submission of messages triggering execution of the jobs in the first job set. The application program may also be considered as an external resource, e.g., if one or more BOs of the application program need to be evaluated which have not yet been imported into the data quality management system. Classifying the jobs in dependence on a monitored rather than a predefined and estimated runtime behavior may be advantageous in the context of a DQMS as the actual runtime behavior of a data quality check may depend on the kind of data stored and may thus not be predictable. Thus, the features may provide for a highly flexible DQMS being operable to reclassify data checks in dependence on their actual runtime behavior, thereby also reducing the time and effort of the operator to maintain the DQMS and the job execution, as both the message-driven as well as the scheduler-driven jobs may be executed fully automatically.

According to embodiments, the message is received by the DQMS from the application program upon the application program executing a database transaction for storing the data in a first database operatively coupled to the application program. The message includes at least a part of the data whose quality is to be evaluated, e.g., some data specifying which of the attributes of a BO is to be modified in combination with the modified attribute value. The transaction is halted until the application program receives a response from the DQMS indicating that the data meets the quality criteria evaluated by one or more of the jobs. If the response indicates that the criteria are not met, the transaction is aborted or a user is prompted to decide if the transaction should nevertheless be carried out.

Alternatively, the user may be provided with means to modify the re-execute the transaction with modified transactional data. The features may be advantageous, as they may allow the DQMS to trigger the execution of jobs contained some particular job sets, e.g., the first job set, in a transaction driven way and in a pro-active manner. This means that the transaction halts until the transaction-driven data quality checks specified in some jobs of the first job set have terminated and have returned a response indicating that the data meets the evaluated quality criteria. Other data quality checks, e.g., those executed by the jobs in the second job set and being triggered by a scheduler, are not executed in response to the transaction. Thus, the application program does not have to wait until the jobs terminate and bottlenecks slowing down its execution can be avoided.

According to embodiments, the job sets further include a third job set. The execution of jobs contained in the third job set is triggered by the scheduler on a regular basis and is in addition triggered upon receipt of a message sent by the application program upon a transactional modification of one of the business objects assigned to the job. Execution of the jobs of the second job set is triggered on a regular basis solely by the scheduler. The scheduler may trigger the execution of the jobs in the third job set according to a different schema (e.g., more frequently) than in the second job set. Using a third job set is, however, optional. Any one of the jobs having a monitored execution time below or equal to a first time threshold is classified as being a member of the first or the third job set. Any one of the jobs having a monitored execution time above the first time threshold is classified as being a member of the second job set. The features may be advantageous as they provide for a highly fine grained data checking job management.

In case a particular job executing a data quality check and previously having been executed as pro-active, short running job being a member of the first job set is monitored and determined to have a long runtime, e.g., because of a change in the underlying data sets or due to a change in the response time of some additional internal or external data resources, reclassifying the job and reallocating the job to e.g., the second job set will also inherently change its trigger mechanism. As a result of the reallocation, the job will now not be a transaction-triggered, pro-active data checking job, but rather a scheduled, re-active data checking job. Thus, the operator does not have to consider any kind of eventualities which may have an impact on the runtime of a job for specifying if the job should be executed as a pro-active or re-active job. The operator, using embodiments of the invention, may rather rely on the automated reclassification of the jobs in dependence on monitored runtime behavior, which may also have an impact on the trigger-mechanism (transaction-based or scheduled) for calling the respective job. This may be particularly advantageous in a DQMS, wherein a transaction-driven, pro-active job taking a longer time than expected may significantly slow down the application as the transaction is halted until a response is received. Depending on the embodiment, the first time threshold may be in the range of one or more minutes, for example, below 30 seconds, and more preferentially below 10 seconds for preventing a reduction in the performance of a user interaction.

According to embodiments, all jobs contained in the same one of the job sets have one or more classification features in common. Reclassifying the at least one job may include determining a value for one or more of the classification features and reclassifying the job in accordance with the determined classification feature values. The one or more classification features can be a repeat-parameter indicating if the job having assigned a respective parameter value is executable on a regular basis; or a total execution time of the job; or a capability of the job for accessing one or more external resources for evaluating the quality of the data; or any combination of two or more of the classification features. This may be advantageous, as a very fine grained classification of jobs and, accordingly, a fine grained control on the job triggering mechanism may be provided. For example, the scheduler may comprise different job triggering schemes for different job sets. An operator may be enabled, e.g., by means of a repeat parameter assigned to each job or corresponding rule encoding the job, if a particular job should be executed repeatedly or not. In addition, by taking into consideration if a job evaluates data of two or more BOs and/or evaluates data of a BO in combination with data to be retrieved from an external resource may allow a classification of jobs based on the 'knowledge' that the job could at least potentially be time consuming, e.g., because a network connection to the external resource may be slow. Thus, any job which may potentially be executed slowly, e.g., because of the evaluation of external data, may be classified e.g., into the second job set to guarantee that the job is not executed as pro-active data quality job which could slow down the application program by halting a transaction.

Depending on the embodiment, the classification feature values may be determined by the DQMS by evaluating program code underlying the job, by evaluating an annotation, e.g., a classification parameter, of the job, and/or by monitoring the runtime behavior of the job in respect to the classification feature. For example, that a job accesses an external resource can be annotated to the job or can be determined by evaluating source code of the job. In case the access to the external resource increases the execution time of the job, the job may as a consequence be re-classified and moved e.g., to the second job set. According to embodiments, each of the jobs is encoded by a respective rule. A reclassification of the at least one job comprises reclassifying the rule encoding the job into a rule set representing the runtime behavior category of the job set to which the job is allocated. The features may be advantageous as an operator of the DQMS can easily recognize and comprehend which kind of rule and corresponding job are currently classified as being a member of a given job set. The operator may also be enabled to modify the rules, e.g., via a GUI, thereby adding or modifying some classification parameters which may be used by the DQMS as classification features in addition to the monitored runtime behavior for classifying a job and a corresponding rule.

According to embodiments, at least a further one of the plurality of jobs is adapted for evaluating the quality criteria on a copy of one of the BOs in combination with further data, the further data being a copy of at least one further BO and/or being data derived from an external resource. The first database from which some missing BOs or missing BO attribute values need to be imported for creating or updating a respective BO copy may, according to embodiments, also be considered as external resource. According to embodiments, the kind of jobs operating on a BO in combination with further data may be automatically determined and classified into the second job set. The features may be advantageous as jobs bearing a significant danger of potentially becoming a long-running job, e.g., because they operate on multiple BOs or external data can be classified as a member of the second job set from the beginning.

According to embodiments, the data whose quality is evaluated is application data and includes one or more copies of BOs respectively specified by a BO schema of the application program. The application program is operatively coupled to a first database having stored the BOs. Executing the data quality checks on copies of the data rather than the data itself may be advantageous as this increases the performance of the application program, in particular, if the application program and the DQMS are hosted on different data processing machines.

According to embodiments, the BOs are stored in the first database. In an embodiment, the data content of the first database is copied to the second database of the DQMS via a BO-level interface. This may be advantageous, as the level abstracts from the structural details of the first database, thus making the data transfer process more generic and easier to adapt to different application systems. Thus, in case the internal structures of the first database should change, the DQMS and the interface used for copying the BOs into the second database are not affected by the amendments.

According to embodiments, the DQMS is operatively coupled to a second database, which in turn includes a copy of the application data and respective copies of the BOs in the second database. The copies of the BOs are stored in the second database in accordance with a mapping, the mapping assigning attributes of the BOs of the BO schema to structural elements of the second database. The features may be advantageous, as a mapping is a simple data structures basically consisting of the assignment. It may be implemented base on a text file or database table comprising human-readable and editable text. The features may be advantageous, as a user can easily comprehend and modify the kind of mapping structure, thereby adapting the way the BO copies are stored in the second database in accordance with the requirements of the data quality checks and the constraints imposed by the second database. For example, it may accelerate the data quality checks if the structure of the tables and indices of the second database used for storing the BO copies is adapted to the respective vendor of the second database.

According to embodiments, the method further comprises accessing, by the DQMS, the BO schema and the mapping for determining attributes of BOs specified in the BO schema being mapped to structural elements of the second database; and creating, by the DQMS using the BO schema and/or the mapping, one or more of the jobs as ETL jobs. The features may be advantageous, as in case any changes to the BO schema and/or the structure of the second database should be made, only minor adjustments have to be made by an operator of the DQMS to adapt the DQMS to the new situation. Basically, only the mapping may have to be modified and new ETL jobs being adapted to the amendments may have to be created to reload the data from the first into the second database. As the ETL jobs are created automatically using the mapping and the BO schema as input, only very little effort of the operator may be required for maintaining the DQMS.

According to embodiments, the plurality of jobs comprises one or more ETL jobs. The ETL jobs comprise first ETL jobs and/or second ETL jobs and/or third ETL jobs. The method further comprises: executing the first ETL jobs for initially creating the second database; the step may comprise creating database table adapted for storing copies of BOs; and/or executing the second ETL jobs for filling the second database with copies of the BOs of the first database; and/or executing the third ETL jobs on a regular basis for updating the copies of the BOs. Preferentially, at least some of the third ETL jobs which regularly update the second database are classified into the second or third job set based on their annotation as being regularly executable and/or based on their monitored runtime behavior. As the jobs in the second and third job set are triggered by the scheduler, the ETL jobs used for updating the second database may be executed on a regular basis, thereby reducing the time and effort required for maintaining the DQMS and keeping the second database up to date. In some embodiments, a third ETL job may also be classified as being a member of the first job set, thereby guaranteeing that a transactional modification of a BO triggers an update of the corresponding BO copy.

According to embodiments, the method comprises: receiving the message from the application program, the message being indicative of one of the BOs stored in the first database and being indicative of modifications to be applied to the BO; modifying a copy of the BO, the copy being stored in the second database, using the indicated modifications as input; if the modified copy of the BO does not comprise all data of the BO, setting a completeness parameter assigned to the modified copy to a value indicating that the copy comprises one or more missing attributes not having been received by the data quality management system from the application program yet. The message may be sent, for example, upon initiating an UPDATE or CREATE transaction in respect to the BO by the application program.

According to embodiments, storing the copy of the BO in the second database comprises marking the BO as incomplete, thereby prohibiting the evaluation of any of the quality checking jobs in the second job set on the BO copy.

According to embodiments, the jobs in the first job set are solely triggered by the receipt of a message sent upon a transactional modification of a BO assigned to the job, the jobs in the second job set are solely triggered by the scheduler on a regular basis, and the jobs in the third job set are triggered by the receipt of a message sent upon a transactional modification of a BO assigned to the job and are triggered by the scheduler on a regular basis. Thus, depending on the actually used triggering mechanism, the quality checking jobs in the third job set may act as pro-active jobs, thereby prohibiting the entry of erroneous data into the first database, or may act in a re-active manner, thereby reporting any errors having been introduced to the first and second database. This 'dual use' of the same job and, if any, the same rule, may be advantageous, as it is not required to create duplicates of the jobs or rules for providing pro-active as well as re-active jobs. Both functions can be provided by the same job being triggered once by the scheduler and once by a transaction. Thus, code duplication is avoided and maintaining the DQMS is facilitated.

According to embodiments, reclassifying a job currently contained in the second job set for becoming a member of the first or third job set comprises: accessing a transactional mapping, the transactional mapping comprising assignments of first BO attributes to BO-type specific transactions supported by a transaction-level interface of the application program; a mapping of one or more attributes to one of the transactions within the transactional mapping indicates that values of the attributes are mandatorily transferred in a message submitted via the interface upon a transactional modification of a BO of a BO-type comprising the attributes; determining, if the quality criteria evaluated by the job on attributes of a BO assigned to the job solely operate on one or more attributes being mandatorily received as part of a message from the application program according to the transactional mapping; in case the execution time of the job is below the first processing time threshold and in case the quality criteria of the job solely operate on attributes whose values are mandatorily received as part of a message triggering the execution of the job, reclassifying the job from the second into the first or third job set; in case the quality criteria of the job operate also on attributes whose values are not received as part of a message triggering the execution of the job, not reclassifying the job from the second into the first or third job set even in case the execution time of the job is below the first processing time threshold. The features may be advantageous, as they guarantee that in case a job is determined to be executed quickly, the job is classified into the first job set or into the third job set only in case it is ensured that the message that may trigger the execution of the job in the future provides the job with all required data to perform the quality checks. Quality-checking jobs contained in the first and/or third job set are enabled to evaluate their respective quality criteria on the BO copy irrespective of the value of the completeness parameter, as they are only classified as being members of the first or third job set if, according to the transactional mapping, it is ensured that any message triggering the execution of the job provides the job with all BO attributes evaluated by the job's quality criteria.

According to embodiments, at least some of the jobs in the second job set execute a data quality check on a BO copy stored in the second database in combination with further data. The further data may be a copy of at least one further BO and/or may be data derived from an external resource. The features may be advantageous as the execution of any kind of quality-checking job contained in the second job set, which preferentially comprises all globally executed data quality checking jobs, may be prohibited until all evaluated BO copies are updated and marked as 'complete'.

According to embodiments, executing the third ETL jobs comprises: evaluating each copy of a respective one of the BOs, the copies being stored in the second database, for determining if the copy has assigned a completeness parameter value indicating that one or more attributes of the BO the copy is derived from are missing attributes which have not yet been received by the DQMS from the application program; in case a BO copy having assigned the third ETL job has assigned a parameter value indicating incompleteness, retrieving the one or more missing attributes from the application program; updating the copy of the BO, thereby completing the copy with the retrieved attributes, and modifying the completeness parameter value of the copy to indicate completeness of the copy. The features may be advantageous, as the execution of the third kind of ETL jobs ensures that the copies of the BOs stored in the second database, in particular the copies having faced some transaction-triggered modifications, comprise all data for enabling some jobs executing global data checks (i.e., data checks evaluating the quality of data of a particular BO copy in combination with further data). If not, the missing data, in particular, missing attribute values, are retrieved by means of the third ETL jobs from the first database. For example, a transaction could trigger a modification of a particular BO and as a consequence a modified copy of the BO may be stored in the second database. For executing some data quality checks, it may be necessary to evaluate further attributes of the BO which were not modified and were not transmitted to the DQMS as part of the message. It may have happened that in the first database some data modifications were executed without triggering the submission of a message. Thus, in order to guarantee that all data evaluated by a particular job is also contained in the second database and is up-to-date, the third ETL jobs may retrieve selected data from the first database, complement the BO copy with the retrieved data, and thereby enable some data quality jobs of the second job set and thus being executed in a re-active manner to operate on up-to-date BO copies comprising all the data to be evaluated.

According to embodiments, each of the jobs has assigned a BO schema definition of respective ones of the BOs. In case a copy of the BO indicated in the message does not exist yet, the copy may be created by means of the assigned application BO schema definition of the indicated BO, whereby the BO copy may be modified in accordance with the modification specified in the message (and in the transaction having triggered submission of the message). The method further comprises: modifying a copy of a BO indicated in the message in accordance with data contained in the message; identifying the one or more jobs associated with the schema definition of the BO indicated in the message, the identified jobs being contained in the first or third job set; executing the one or more identified jobs on the modified copy of the BO for evaluating if the quality criteria evaluated by the jobs are met by the modified copy; and sending a response to the application program, the response indicating if the modified copy of the first data object meets the evaluated quality criteria. That the jobs operate on the BO level, not on the level of the transactional data received in the message may be advantageous, as the DQMS is decoupled from the particularities of the structure of the first database; it is only coupled to the semantic structure of BOs as specified in the application BO schema. This may ease maintaining the DQMS. The jobs may be associated by respective BOs e.g., means of an ID mapping of job type IDs and BO type IDs. The message may comprise a BO type ID.

According to embodiments, the message is received via a first legacy interface of the application program, the first legacy interface having been designed or used for data quality checks to be executed on transactional data, a transaction being a modification or storing of one of the BOs in the first database, the message comprising transactional data of the BO. The first interface may have been used for pro-active, application-program-internal quality checks. The method further comprises using a second legacy interface of the application program for retrieving any data stored in the first database for initially filling and/or updating the second database via one or more of the jobs being ETL jobs. The second legacy interface may have been developed for data exchange purposes on a BO-level. The ETL jobs operate on a BO level. The features may be advantageous, as legacy interfaces already existing in many applications and ERP systems can be used and rewriting any code in the application program may be unnecessary. In addition, the features may allow providing for a DQMS being operable to integrate both transaction-based, pro-active data quality checks with checks operating on the BO level. BO-level checks may be, for example, necessary for evaluating data quality and consistency of a plurality of BOs. Thus, embodiments of the invention may be able to receive transaction-level data via the message, use the data for creating and/or modifying a corresponding BO copy, and for executing transaction driven and pro-active quality check by means of the data quality checking jobs in the first and third job sets as well as the scheduled, re-active data quality checking jobs of the second and third job sets within one and the same DQMS. Thereby, a problem of state of the art DQMS is overcome which were often restricted to either purely transaction-based pro-active DQMSs or BO-level based, global and re-active DQMSs. Preferentially all data quality checking jobs contained in any one of the job sets operate on copies of the BOs and not directly on transactional data lacking the semantic structure of the respective BOs. For example, the copies of the BOs stored in the second database may be created by means of one of the ETL jobs which have been created in dependence on the semantic structure of the BOs as specified in the application BO schema or may be created by the DQMS from the transactional data contained in the received message by using the application BO schema in combination with the mapping. After having created or read the BO copy for which a data quality checking job is to be performed, the job is executed on the BO copy, not on the mere transactional data within the message.

In a further aspect, the invention relates to a computer-readable medium comprising computer-readable program code embodied therewith which, when executed by a processor, cause the processor to execute the method described herein.

In a further aspect, the invention relates to a computer system comprising a DQMS. The DQMS comprises a processing engine, a monitoring module, a classification module and a scheduler. The DQMS is adapted for checking data quality of data of an application program. The processing engine is adapted for executing at least one of a plurality of jobs, the at least one executed job being adapted for evaluating the data for compliance with one or more quality criteria. Each of the jobs is a member of one of a plurality of job sets, the plurality of job sets comprising at least a first job set and a second job set. Each of the job sets represents a runtime behavior category, the jobs contained in each job set having been classified into the runtime behavior categories in accordance with their respective runtime behavior. Execution of the jobs contained in the first job set is triggered by a message received by the data quality management system from the application program. Execution of the jobs contained in the second and third job set is triggered by a scheduler of the data quality management system. The monitoring module is adapted for monitoring the runtime behavior of at least one of the executed jobs for determining a current runtime behavior of the job. The classification module is adapted for automatically or semi-automatically reclassifying the at least one monitored job by reallocating the job to the job set representing the determined current runtime behavior.

According to some embodiments, the data is application data of the application program. The application data comprises a plurality of BOs. The computer system further comprises the application program, a first database and a second database. The application program is operatively coupled to the first database having stored the BOs. The second database is operatively coupled to the DQMS and comprises a copy of the application data and the BOs in the second database in accordance with a mapping. The mapping assigning attributes of the BOs of the BO schema to structural elements of the second database. The data quality management system is adapted for: accessing the BO schema and the mapping for determining attributes of BOs specified in the BO schema being mapped to structural elements of the second database; creating, by using the BO schema and/or the mapping, one or more of the jobs as ETL jobs.

According to some embodiments, a manual or semi-manual reclassification of some of the jobs may be supported in addition. According to embodiments, the reclassification follows a schema specified in the following table:

|  | To First Rule Set | To Second Rule Set | To Third Rule Set |
| --- | --- | --- | --- |
| From $1^{st}$ Rule Set | Not applicable | processing time >=$1^{st}$ time threshold | (automated or manual) setting of repeat parameter to a value indicating repeated execution is required |
| From $2^{nd}$ Rule Set | processing time <first time threshold + transaction-triggered message comprises all BO attributes evaluated by the job + the job does not access an external resource | Not applicable | Processing time <first time threshold + transaction-triggered message comprises all BO attributes evaluated by the job + the job does access an an external resource |
| From $3^{rd}$ | Repeat parameter was (manually or automatically) set to a value indicating that a repeated job execution is not required anymore | processing time >=first time threshold | not applicable |

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

What is claimed is:

1. A computer-implemented method for checking data quality of data of an application program by a data quality management system, the method comprising:

executing, by a processor of the data quality management system, at least one of a plurality of jobs that is adapted for evaluating the data for compliance with one or more quality criteria, each of the plurality of jobs is a member of one of a plurality of job sets, the plurality of job sets comprising at least a first job set and a second job set, and each of the job sets is classified into runtime behavior categories in accordance with its respective runtime behavior;

monitoring the runtime behavior of at least one executed job by the data quality management system for determining a current runtime behavior of the executed job; and reclassifying at least one monitored job by reallocating the monitored job to the job set representing the determined current runtime behavior; wherein:

the data includes application data comprising one or more business objects specified by a business object schema of the application program, the application program is operatively coupled to a first database having stored the business objects, and the data quality management system is operatively coupled to a second database, the second database comprising a copy of the application data and respective copies of the business objects in accordance with a mapping of assigned attributes of the business objects of the business object schema to structural elements of the second database;

accessing, by the data quality management system, the business object schema and the mapping for determining attributes of business objects specified in the business object schema, the attributes being mapped to the structural elements of the second database; and creating, by the data quality management system using at least one of the business object schema and the mapping, one or more of the jobs as extract-transform-load jobs.

2. The computer-implemented method of claim 1, wherein:

execution of the jobs contained in the first job set is triggered by a message received by the data quality management system from the application program;

execution of the jobs contained in the second job set is triggered by a scheduler of the data quality management system; and the message is received by the data quality management system from the application program upon the application program executing a database transaction for storing the data in a first database, the first database being operatively coupled to the application program, the message comprising at least a part of the data whose quality is to be evaluated;

wherein the database transaction is halted until the application program receives a response from the data quality management system, the response indicating that the data meets the quality criteria evaluated by one or more of the jobs.

3. The computer-implemented method of claim 1, wherein the job sets further comprise a third job set, and wherein:

the execution of jobs contained in the third job set is triggered by the scheduler on a regular basis and is in addition triggered upon receipt of a message sent by the application program upon a transactional modification of a business object assigned to the job;

the execution of the jobs of the second job set is triggered on a regular basis solely by the scheduler;

any one of the jobs having an execution time below or equal to a first time threshold is classified as being a member of the first or third job set; and wherein any one of the jobs having an execution time above the first time threshold is classified as being a member of the second job set.

4. The computer-implemented method of claim 1, wherein all jobs contained in the same one of the job sets have one or more classification features in common, and wherein reclassifying the at least one job comprises determining a value for one or more of the classification features and reclassifying the job in accordance with the determined classification feature values, and wherein the one or more classification features are selected, in any combination, from a group comprising:

a repeat-parameter indicating if the job having assigned a respective parameter value is executed on a regular basis;

a total execution time of the job; and a capability of the job for accessing one or more external resources for evaluating the quality of the data.

5. The computer-implemented method of claim 1, wherein at least a further one of the plurality of jobs is adapted for evaluating quality criteria on a copy of a business object in combination with further data, the further data being at least one of a copy of at least one further business object and data derived from an external resource, the method comprising:

determining, that the further job evaluates quality criteria on a copy of one of the business object in combination with further data; and classifying the job as being a member of the second job set as a result of the determination.

6. The computer-implemented method of claim 1, wherein the plurality of jobs comprises one or more extract-transform-load jobs, the extract-transform-load jobs comprising at least one of first extract-transform-load jobs, second extract-transform-load jobs, and third extract-transform-load jobs, the method further comprising performing at least one of:

executing the first extract-transform-load jobs for initially creating the second database;

executing the second extract-transform-load jobs for filling the second database with copies of the business objects of the first database; and executing the third extract-transform-load jobs on a regular basis for updating one or more copies of the business objects.

7. The computer-implemented method of claim 1, further comprising:

receiving the message from the application program, the message being indicative of a business object stored in a first database and being indicative of modifications to be applied to the business object;

modifying a copy of the indicated business object, the copy being stored in a second database, using the indicated modifications as input; and upon determining the modified copy of the business object does not comprise all data of the business object, setting a completeness parameter assigned to the modified copy to a value indicating that the copy comprises one or more missing attributes not having been received by the data quality management system from the application program yet.

8. The computer-implemented method of claim 7, wherein modifying the copy of the business object in the second database comprises setting a completeness parameter assigned to the copy to a value indicating incompleteness, thereby prohibiting the evaluation of any of the quality criteria by data quality checking jobs contained in the second job set on the copy;

wherein data quality checking jobs contained in the first and/or third job set are operable to evaluate their respective quality criteria on the business object copy irrespective of the value of the completeness parameter.

9. The computer-implemented method of claim 8, wherein executing the third extract-transform-load jobs on a regular basis comprises:

evaluating each copy of a respective one of the business objects, the copies being stored in the second database, for determining if the copy has assigned a completeness parameter value indicating that one or more attributes of the business object the copy is derived from are missing attributes which have not yet been received by the data quality management system from the application program;

retrieving the one or missing attributes from the application program; and updating the copy of the business object, thereby completing the copy with the retrieved missing attributes, and modifying the completeness parameter value of the copy to indicate completeness of the copy.

10. The computer-implemented method of claim 1, wherein each of the jobs has assigned a business object schema definition of respective ones of the business objects, the method comprising:

modifying a copy of a business object indicated in the message in accordance with data contained in the message;

identifying one or more jobs contained in the first or third job set and being associated with the schema definition of the business object indicated in the message;

executing the one or more identified jobs on the modified copy of the business object for evaluating if the quality criteria evaluated by the jobs are met by the updated copy; and sending a response to the application program, the response indicating if the modified copy of the first data object meets the evaluated quality criteria.

11. The computer-implemented method of claim 1, wherein the message is received via a first legacy interface of the application program, the first legacy interface having been designed or used for data quality checks to be executed on transactional data, a transaction being a modification or storing of one of the business objects in the first database, the message comprising transactional data of a business object;

the method further comprising using a second legacy interface of the application program for retrieving any data stored in the first database for initially filling and/or updating the second database via one or more of the jobs being extract-transform-load jobs, the extract-transform-load jobs operating on a business object level.

12. A computer-readable medium for checking data quality of data of an application program by a data quality management system, the computer-readable medium comprising non-transitory computer-readable program code embodied therewith which, when executed by a processor, causes the processor to execute a method, the method comprising:

executing at least one of a plurality of jobs that is adapted for evaluating the data for compliance with one or more quality criteria, each of the plurality of jobs is a member of one of a plurality of job sets, the plurality of job sets comprising at least a first job set and a second job set, and each of the job sets classified into runtime behavior categories in accordance with their respective runtime behavior;

monitoring the runtime behavior of at least one executed job by the data quality management system for determining a current runtime behavior of the executed job; and reclassifying at least one monitored job by reallocating the monitored job to the job set representing the determined current runtime behavior; wherein:

the data includes application data comprising one or more business objects specified by a business object schema of the application program, the application program operatively coupled to a first database having stored the business objects, and the data quality management system is operatively coupled to a second database, the second database comprising a copy of the application data and respective copies of the business objects in accordance with a mapping of assigned attributes of the business objects of the business object schema to structural elements of the second database;

accessing, by the data quality management system, the business object schema and the mapping for determining attributes of business objects specified in the business object schema, the attributes being mapped to the structural elements of the second database; and creating, by the data quality management system using the business object schema and/or the mapping, one or more of the jobs as extract-transform-load jobs.

13. The computer-readable medium of claim 12, wherein:
execution of the jobs contained in the first job set is triggered by a message received by the data quality management system from the application program;
execution of the jobs contained in the second job set is triggered by a scheduler of the data quality management system; and
the message is received by the data quality management system from the application program upon the application program executing a database transaction for storing the data in a first database, the first database being operatively coupled to the application program, the message comprising at least a part of the data whose quality is to be evaluated;
wherein the database transaction is halted until the application program receives a response from the data quality management system, the response indicating that the data meets the quality criteria evaluated by one or more of the jobs.

14. The computer-readable medium of claim 12, wherein the job sets further comprise a third job set, and wherein:
the execution of jobs contained in the third job set is triggered by the scheduler on a regular basis and is in addition triggered upon receipt of a message sent by the application program upon a transactional modification of a business object assigned to the job;
the execution of the jobs of the second job set is triggered on a regular basis solely by the scheduler;
any one of the jobs having an execution time below or equal to a first time threshold is classified as being a member of the first or third job set; and
wherein any one of the jobs having an execution time above the first time threshold is classified as being a member of the second job set.

15. The computer-readable medium of claim 12, wherein all jobs contained in the same one of the job sets have one or more classification features in common, wherein reclassifying the at least one job comprises determining a value for one or more of the classification features and reclassifying the job in accordance with the determined classification feature values, and wherein the one or more classification features are selected, in any combination, from a group comprising:
a repeat-parameter indicating if the job having assigned a respective parameter value is executed on a regular basis;
a total execution time of the job; and
a capability of the job for accessing one or more external resources for evaluating the quality of the data.

16. The computer-readable medium of claim 12, wherein at least a further one of the plurality of jobs is adapted for evaluating quality criteria on a copy of a business object in combination with further data, the further data being at least one of a copy of at least one further business object and data derived from an external resource, the method comprising:
determining, that the further job evaluates quality criteria on a copy of one of the business object in combination with further data; and
classifying the job as being a member of the second job set as a result of the determination.

17. A computer system comprising:
a data quality management system comprising a processing engine, a monitoring module, a classification module and a scheduler, the quality management system being adapted for checking data quality of data of an application program;
wherein the processing engine is adapted for executing at least one of a plurality of jobs that is adapted for evaluating the data for compliance with one or more quality criteria,
wherein each of the jobs is a member of one of a plurality of job sets, the plurality of job sets comprising at least a first job set and a second job set, and each of the job sets classified into the runtime behavior categories in accordance with their respective runtime behavior;
wherein the monitoring module is adapted for monitoring the runtime behavior of at least one of the executed jobs for determining a current runtime behavior of the job; and
wherein the classification module is adapted for reclassifying the at least one monitored job by reallocating the job to the job set representing the determined current runtime behavior; wherein:
the data includes application data comprising one or more business objects specified by a business object schema of the application program, the application program operatively coupled to a first database having stored the business objects, and the data quality management system is operatively coupled to a second database, the second database comprising a copy of the application data and respective copies of the business objects in accordance with a mapping of assigned attributes of the business objects of the business object schema to structural elements of the second database;
accessing, by the data quality management system, the business object schema and the mapping for determining attributes of business objects specified in the business object schema, the attributes being mapped to the structural elements of the second database; and
creating, by the data quality management system using the business object schema and/or the mapping, one or more of the jobs as extract-transform-load jobs.

18. The computer system of claim 17, wherein:
execution of the jobs contained in the first job set is triggered by a message received by the data quality management system from the application program;
execution of the jobs contained in the second job set is triggered by a scheduler of the data quality management system; and
the message is received by the data quality management system from the application program upon the application program executing a database transaction for storing the data in a first database, the first database being operatively coupled to the application program, the message comprising at least a part of the data whose quality is to be evaluated;
wherein the database transaction is halted until the application program receives a response from the data quality management system, the response indicating that the data meets the quality criteria evaluated by one or more of the jobs.

19. The system of claim 17, wherein the job sets further comprise a third job set, and wherein:
the execution of jobs contained in the third job set is triggered by the scheduler on a regular basis and is in addition triggered upon receipt of a message sent by the application program upon a transactional modification of a business object assigned to the job;
the execution of the jobs of the second job set is triggered on a regular basis solely by the scheduler;
any one of the jobs having an execution time below or equal to a first time threshold is classified as being a member of the first or third job set; and
wherein any one of the jobs having an execution time above the first time threshold is classified as being a member of the second job set.

20. A computer-implemented method for checking data quality of data of an application program by a data quality management system, the method comprising:
executing, by a processor of the data quality management system, at least one of a plurality of jobs that is adapted for evaluating the data for compliance with one or more quality criteria, each of the plurality of jobs is a member of one of a plurality of job sets, the plurality of job sets comprising at least a first job set and a second job set, and each of the job sets classified into runtime behavior categories in accordance with their respective runtime behavior; wherein execution of the jobs contained in the first job set is triggered by a message received by the data quality management system from the application program, and execution of the jobs contained in the second job set is triggered by a scheduler of the data quality management system;
monitoring the runtime behavior of at least one executed job by the data quality management system for determining a current runtime behavior of the executed job; and
reclassifying at least one monitored job by reallocating the monitored job to the job set representing the determined current runtime behavior; wherein the data includes application data comprising one or more business objects specified by a business object schema of the application program, the application program operatively coupled to a first database having stored the business objects, and the data quality management system is operatively coupled to a second database, the second database comprising a copy of the application data and respective copies of the business objects in accordance with a mapping of assigned attributes of the business objects of the business object schema to structural elements of the second database;
accessing, by the data quality management system, the business object schema and the mapping for determining attributes of business objects specified in the business object schema, the attributes being mapped to the structural elements of the second database; and
creating, by the data quality management system using the business object schema and/or the mapping, one or more of the jobs as extract-transform-load jobs.

* * * * *